(12) United States Patent
Fries

(10) Patent No.: US 6,702,504 B2
(45) Date of Patent: Mar. 9, 2004

(54) CLAMPING APPARATUS

(75) Inventor: Karl Fries, Reinach (CH)

(73) Assignee: Erowa AG, Reinach (CH)

( * ) Notice: Subject to any disclaimer, the term of this patent is extended or adjusted under 35 U.S.C. 154(b) by 24 days.

(21) Appl. No.: 10/117,391

(22) Filed: Apr. 5, 2002

(65) Prior Publication Data

US 2002/0159830 A1 Oct. 31, 2002

(30) Foreign Application Priority Data

Apr. 27, 2001 (CH) .......................................... 2001 0778

(51) Int. Cl.[7] .............................................. B25B 13/50
(52) U.S. Cl. .................................. 403/322.1; 403/324
(58) Field of Search ........................... 285/309; 9/312; 403/343, 322.4, 322.3, 322.1, 321, 324, 374.4, 374.1

(56) References Cited

U.S. PATENT DOCUMENTS

| | | |
|---|---|---|
| 2,043,274 A | 6/1936 | Wegner |
| 2,629,277 A | 2/1953 | Valvano |
| 3,194,938 A | 7/1965 | Smith |
| 3,741,573 A | 6/1973 | Treer |
| 3,827,728 A * | 8/1974 | Hynes .................... 285/309 X |
| 4,074,912 A * | 2/1978 | Van Bilderbeek et al. .. 285/309 |
| 5,315,902 A | 5/1994 | Ragland et al. |
| 5,640,430 A * | 6/1997 | Cudak et al. ................ 375/343 |
| 5,865,560 A * | 2/1999 | Mercat et al. ........... 403/322.4 |

FOREIGN PATENT DOCUMENTS

DE 288152 10/1915

* cited by examiner

Primary Examiner—John R. Cottingham
(74) Attorney, Agent, or Firm—Maginot, Moore & Beck

(57) ABSTRACT

A clamping apparatus for fixing and non-rotatably clamping threaded shafts, particularly threaded shafts used as electrodes for eroding threads, comprises a hollow cylindrical shaft with a clamping sleeve member located at its front end. The clamping sleeve member has a central bore and a rectangular aperture opening into that central bore. A rectangular clamping member is slidably received in the aperture and comprises at its front surface, facing the central bore, a number of thread convolutions matching the thread convolutions of the shaft to be clamped. For moving the clamping element towards a threaded shaft received in the central bore, a rotating collar is provided, located around the outside of the clamping sleeve member, and having a an inner circular surface with a diametrically gradually enlarging recessed portion into which the clamping element protrudes. By rotating the collar, the clamping element is radially moved toward a threaded shaft inserted into the bore, until the thread convolutions of the clamping element engage the thread convolutions of the shaft in the bore.

20 Claims, 1 Drawing Sheet

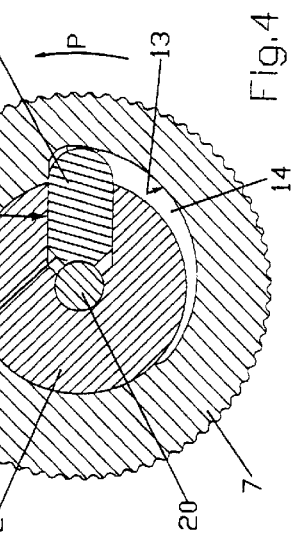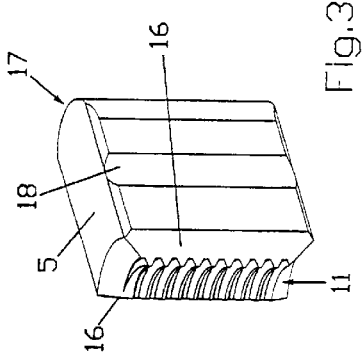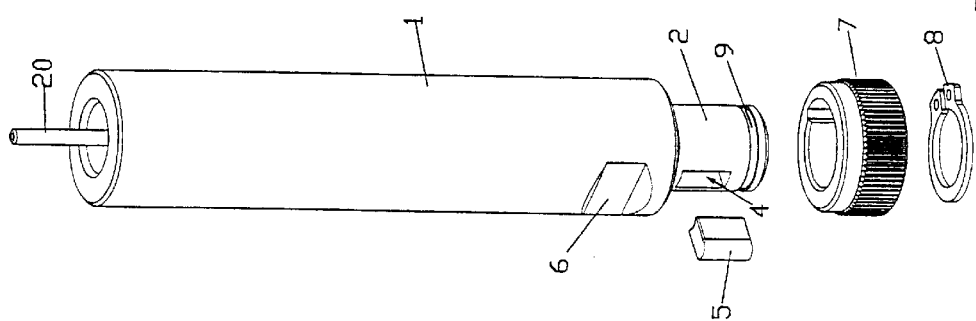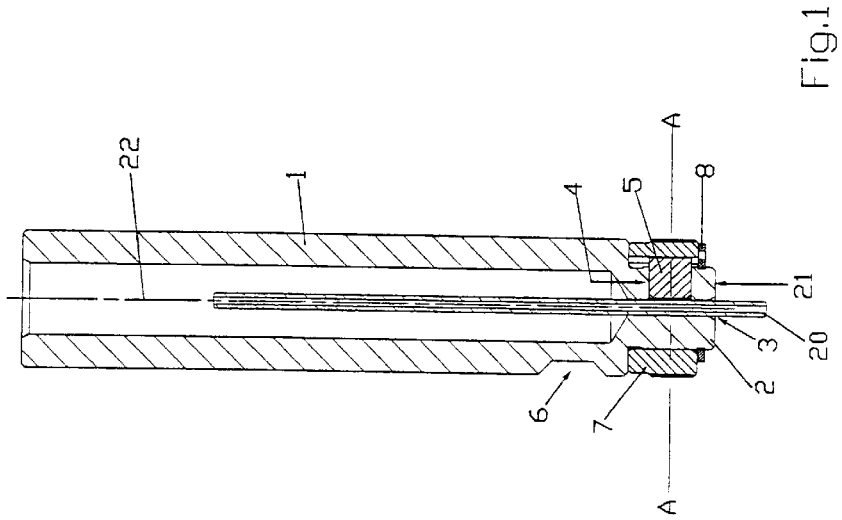

CLAMPING APPARATUS

BACKGROUND OF THE INVENTION

The present invention refers to a clamping apparatus for fixing and non-rotatably clamping threaded shafts, particularly threaded shafts used as electrodes for eroding threads.

In order to fix and clamp, respectively, threaded shafts used as electrodes for eroding threads, usually clamping devices in the kind of split chucks or collet chucks are used that are inserted in a corresponding chuck holding device and clamped therein. The threaded shaft to be firmly held in place is inserted into the central opening of the split chuck and clampingly fixed in the desired position. This kind of fixing has two fundamental disadvantages. First, only the crests of the thread convolutions rest against the inner wall of the split chuck and are clamped therein, with the result that the thread convolutions could be damaged, particularly in the case of V-threads. Second, the position of the thread with regard to the split chuck and the chuck holder, respectively, is not exactly defined. The result is that the position of the thread and the thread convolutions, respectively, with regard to the chuck holder changes upon a positional adjustment of the threaded shaft, for instance an axial re-adjustment, required due to wear. However, since it is common practice in the process of eroding threads to initially roughing a number of threads with a first portion of the threaded electrode shaft and then, after positionally adjusting the threaded electrode shaft, to finally erode the pre-roughed thread with a second, unused portion of the threaded electrode shaft, the danger exists that the positions of the thread convolutions of the afore mentioned first portion of the threaded electrode shaft and of the afore mentioned second portion of the threaded electrode shaft do not coincide. The result is that no precise thread flanks can be realized; the final thread does not fulfill high quality standards. Thereby, it is understood that the used portion of the threaded electrode shaft is cut off before a new, unused portion of the threaded electrode shaft is applied.

PRIOR ART

U.S. Pat. No. 2,629,277 discloses a stud bolt wrench used for inserting and removing stud bolts. The wrench comprises a body provided with an axial base bore and a base portion having an essentially coaxial counterbore extending along approximately 180° of the periphery. Moreover, the base portion has a transverse slot crossing both the base bore and the counterbore. For fixing the stud bolt, a two-part clamping set is provided. The clamping set consists of a stationary part and a movable part, whereby both parts are provided with thread convolutions for engaging the stud bolt. The stationary clamping part is inserted into the counterbore, while the movable clamping part is received in the slot. The two clamping parts are biased by means of a spring in such a way that a stud bolt received in the clamping set is clampingly fixed therein.

The German Patent No. 288,152 discloses a tool for inserting and removing stud bolts. This tool consists of an outer housing provided, on its inner side, with several eccentric, curved surfaces. Received in these curved surfaces are jaws provided with inwardly protruding catches. The catches are provided with thread convolutions for fixing stud bolts. The jaws are held in their positions by means of springs. In order to fix a stud bolt in the tool, the outer housing is rotated with regard to the jaws. Thereby, the jaws are moved radially inwardly under the influence of the eccentric, curved surfaces, such that the thread convolutions of the jaws engage the corresponding thread of the stud bolt.

Finally, U.S. Pat. No. 2,073,274 discloses a stud screw wrench having a hexagonal housing which is provided with a central aperture delimited by four cam-shaped surfaces. Inserted into that aperture is a sleeve having four slots, whereby the sleeve is provided with an inner thread for fixing a stud bolt. The sleeve is divided into four sections by means of the afore mentioned slots. The four sleeve sections are pressed inwardly upon rotating the housing with regard to sleeve the under the influence of the cam-shaped surfaces. In this way, a stud bolt received in the tool is clampingly fixed.

A fundamental disadvantage of the afore mentioned devices can be seen in the fact that the position of a threaded bolt or shaft is not exactly defined nor can be exactly predicted. The reason is that the position of the bolt or shaft with regard to the clamping device depends on the fact, in the case of devices provided with rotating clamping jaws or elements, with how much torque the clamping jaws have been tightened to bring them into their clamping position and in what final position they are.

On the other side, the afore mentioned devices have no provisions or means to align them and, thereby, the bolts or shafts received therein, in such a way that both the axial position and the angular orientation of the bolt or shaft is precisely defined.

OBJECTS OF THE INVENTION

It is an object of the invention to provide a clamping apparatus for fixing and non-rotatably clamping threaded shafts that avoids the afore mentioned disadvantages, i.e. to provide a clamping apparatus in which a threaded shaft can be fixed quickly, easily and with high, repeatable accuracy.

SUMMARY OF THE INVENTION

In order to meet this and other objects, the invention provides an apparatus for fixing and non-rotatably clamping threaded shafts comprising a hollow tubular housing having a central longitudinal axis. The hollow tubular housing comprises an aperture extending in radial direction with regard to the central longitudinal axis and has a rectangular cross sectional shape. A clamping element is slidably received in that aperture and has a front face provided with thread convolutions. An operating element is provided to slidably move the clamping element received in the aperture towards the central bore and to lock a threaded shaft inserted into the central bore with high positional accuracy and repeatability.

Due to the rectangular shape of the aperture and the clamping element, it is ensured that the position of the clamping element with regard to the clamping apparatus does not change, with the result, that a threaded shaft is clamped in the apparatus always in exactly the same axial position.

Preferably, the housing of the apparatus is provided with a reference surface portion, allowing an exact alignment of the clamping apparatus as a whole, and thereby of course also of the threaded shaft clamped therein, with regard to, for instance, a machine tool.

BRIEF DESCRIPTION OF THE DRAWINGS

In the following, an embodiment of the apparatus according to the invention will be further described, with reference to the accompanying drawings, in which:

FIG. 1 shows a longitudinal sectional view of the apparatus;

FIG. 2 shows the essential parts and elements of the apparatus in an exploded perspective view;

FIG. 3 shows a perspective view of the clamping element; and

FIG. 4 shows a cross sectional view of the apparatus, taken along line A—A in FIG. 1.

DETAILED DESCRIPTION OF A PREFERRED EMBODIMENT

According to FIG. 1, the clamping apparatus comprises a hollow cylindrical shaft member 1. The front portion thereof, i.e. the lower portion as shown in FIG. 1, is provided with a cylindrical clamping sleeve member 2. The clamping sleeve member 2 has a central bore 3 adapted to receive a threaded shaft 20. It is understood that the diameter of the central bore 3 matches the external diameter of the threaded shaft 20 to be received therein.

The clamping sleeve member 2 is provided with an aperture 4 opening into the central bore 3. The aperture 4 is adapted to receive a radially movable clamping element 5, to be described in more detail herein below, and having generally rectangular cross section. In this connection, radially movable shall mean towards and away from the threaded shaft 20 received in the bore 3. The aperture 4 has a cross section whose width and height is adapted to the dimensions of the clamping element 5 such that the latter one slides in the aperture 4 with essentially zero clearance. Thus, the clamping element 5 is received in the aperture without the possibility to twist and rotate, respectively, and also the horizontal and the vertical positions thereof are well defined. The operation and exact design of the clamping element 5 will be further explained hereunder with reference to FIG. 3.

Around the outer periphery of the clamping sleeve member 2, a rotating annular operating element 7 is provided, adapted to radially move the clamping element 5. The lower end (as seen in FIGS. 1 and 2) of the clamping sleeve member 2 is provided with a groove 9 adapted to receive a retaining ring member 8 preventing the annular operating element 7 from sliding off the clamping sleeve member 2, i.e. keeping the operating element 7 in the desired position.

The outer surface of the hollow cylindrical shaft member 1 is provided with a reference surface portion 6 enabling the clamping apparatus to be positioned in a well defined location, for instance with regard to a machine tool. That reference surface portion 6 is designed and located such that it enables the location of the clamping apparatus to be determined both in vertical direction, for example with reference to its front face 21 and also with regard to its angular orientation around its longitudinal central axis 22. The result is that the entire clamping apparatus, and thereby also the threaded shaft 20 clamped therein, can be precisely positioned.

FIG. 2 shows the essential parts and elements of the clamping apparatus, particularly the hollow cylindrical shaft member 1, the clamping sleeve member 2 with its aperture 4 provided therein, the clamping element 5, the annular operating member 7 as well as the retaining ring member 8, in an exploded perspective view. Moreover, the groove 9 adapted for receiving the retaining ring member 8 can be clearly seen. Finally, the threaded shaft 20 is schematically shown.

FIG. 3 shows the clamping element 5 in a perspective view. As can be seen, the front (i.e. left according to FIG. 3) surface portion of the clamping element 5 is provided with a plurality of thread convolutions 11 that are matching the thread convolutions of the threaded shaft 20. The back or opposite surface portion 17 of the clamping element 5 is rounded. Moreover, the lateral surface portions 16 adjacent to the aforementioned thread convolutions 11 of the clamping element 5 are chamfered. Finally, one of the lateral faces of the clamping element 5 is provided with a groove 18 serving as an orientation aid, ensuring that the clamping element 5 is inserted into the aperture 4 always in the same orientation.

With the aid of FIG. 4, showing an enlarged cross sectional view of the clamping apparatus along the line A—A in FIG. 1, the design and the operation of the clamping apparatus is further explained. Clearly visible in this view are the clamping sleeve member 2 with the aperture 4 provided therein, the clamping element 5, the rotating annular operating element 7 as well as the threaded shaft 20 to be clamped in the apparatus. In the view according to FIG. 4, the clamping element 5 is shown in its rest position in which its thread convolutions do not engage the thread convolutions of the threaded shaft 20. Thus, the latter one is not fixed and therefore movable in axial direction.

As can be further seen in FIG. 4, the interior of the annular operating member 7 is not exactly circular, but is provided with a radially gradually enlarging recessed portion 14 along a part of its inner periphery. In the rest position of the clamping member 5 as shown in FIG. 4, the rounded back surface portion of the clamping member 5 rests against the deepest portion of the afore mentioned recessed portion 14. For clamping the threaded shaft 20, the annular operating member 7 is rotated in the direction of the arrow P. Thereby, the clamping member 5 is radially moved against the threaded shaft 20 with the result that the thread convolutions 11 of the clamping member 5 engage the thread convolutions of the threaded shaft 20 to radially and axially fix the latter one with regard to the clamping apparatus.

For releasing the threaded shaft 20, the annular operating element is rotated against the direction of the arrow P. The result is that the rounded back surface portion of the clamping element 5 no longer rests against the wall 13 of the recessed portion 14 of the annular operating member 7 such that the clamping element 5 can move radially away from the threaded shaft 20. After releasing the annular operating element 7, the threaded shaft 20 can be axially moved by rotating it. If the annular operating member 7 is in its rest position as shown in FIG. 4, the threaded shaft 20 can be axially moved even by pulling or pushing it, since the clamping element 5 is not self-locking; by pulling or pushing the threaded shaft 20, its thread convolutions push the clamping element 5 radially outwards.

Once the threaded shaft 20 is axially moved to a new location, and upon tightening the annular operating element 7, the clamping element 5 is moved radially inwardly again, with the result that its thread convolutions 11 engage the thread convolutions of the threaded shaft 20 and fix the latter one again in a well defined axial and radial position with regard to the clamping apparatus. The outer surface of the annular operating element 7 is provided with a corrugation 19 to ease its operation.

As can be further seen from FIG. 4, the aperture 14 opening into the central bore 3 has a conically narrowing portion at the end facing the central bore 3 and the threaded shaft 20, respectively. This conical portion serves as a stop against which the chamfered front portion 16 of the clamping element 5 comes to rest in order to prevent a too deep or tight engagement between the thread convolutions 11 of the clamping member 5 and the thread convolutions of the threaded shaft 20.

The embodiment of the clamping apparatus of the invention as herein before described and shown in the drawings is particularly suitable for clamping threaded shafts 20 having a small diameter and for threaded shafts in the form of electrodes as they are used for eroding threads, for instance in the metric size between M3 and M10. In this connection, it should be understood that a threaded shaft for eroding a M3 thread has an outer diameter of only 1.7 millimeters, with a pitch of 0.5 millimeters. It is further understood that it is extremely difficult to manufacture such a small thread by conventional thread cutting. Thus, the embodiment with the shown clamping element 5 is particularly suitable for threaded shafts having small outer diameters, since it is relatively easy to provide the front surface portion of the clamping element 5 with corresponding thread convolutions 11.

In order to keep the clamping element 5 in the rest position shown in FIG. 4, the annular operating element 7 being released, a spring member (not shown) can be provided, biasing the clamping element 5 in its rest position.

What is claimed is:

1. An apparatus for fixing and non-rotatably clamping threaded shafts, comprising:
    a hollow tubular housing means having a central bore defining a central longitudinal axis;
    said hollow tubular housing means comprising an aperture means extending in a radial direction with regard to said central longitudinal axis and having a rectangular cross sectional shape;
    a clamping means adapted to be slidably received in said aperture means and having a front surface means provided with thread convolution means; and
    an operating means adapted to slidably move said clamping means received in said aperture means towards said central bore means and to lock a threaded shaft inserted into said bore means;
    wherein said operating means comprises an annular rotating collar means located around said hollow tubular housing means and having an inner circular surface with a radially, gradually enlarging recessed portion facing said clamping element, thereby adapted to move said clamping means towards said bore means upon rotation of said collar means.

2. Apparatus according to claim 1 in which said hollow tubular housing means is provided with a reference surface portion means.

3. Apparatus according to claim 1 in which said hollow tubular housing means includes a sleeve means coaxially located with said central longitudinal axis at the end of said hollow tubular housing means, defining a bore segment of said central bore with a diameter adapted to receive said threaded shaft means to be fixed, whereby said aperture means is located in said sleeve means.

4. Apparatus according to claim 1 in which said clamping means is received in said aperture means in an essentially clearance-free manner.

5. Apparatus according to claim 1 in which said aperture means opening into said central bore means is provided with a conically narrowed portion at the end facing said central bore means to form a stop means.

6. Apparatus according to claim 1 in which said clamping means has a lateral face means having a chamfered portion adjacent to said front face means, said chamfered portions adapted to rest against said narrowed portion of said aperture means.

7. Apparatus according to claim 1 in which said clamping means is positionable in a rest position in which said thread convolution means provided on its front surface means are disengaged from the thread convolutions of a threaded shaft inserted into said central bore means.

8. Apparatus according to claim 1 in which said collar means is manually rotatable, whereby its outer surface is provided with a corrugation means.

9. Apparatus according to claim 1 in which said clamping means has a back surface means located opposite to said front surface means, said back surface means having a rounded shape.

10. Apparatus according to claim 1 in which said housing means is provided with a retaining ring means located below said rotating collar means.

11. Apparatus according to claim 1 in which said clamping means is provided with a marking means adapted to identify its position.

12. Apparatus according to claim 3 in which said clamping means is received in said aperture means in an essentially clearance-free manner.

13. Apparatus according to claim 3 in which said aperture means opening into said central bore means is provided with a conically narrowed portion at the end facing said central bore means to form a stop means.

14. Apparatus according to claim 5 in which said clamping means has a lateral face means having a chamfered portion adjacent to said front face means, said chamfered portions adapted to rest against said narrowed portion of said aperture means.

15. Apparatus according to claim 3 in which said clamping means is positionable in a rest position in which said thread convolution means provided on its front surface means are disengaged from the thread convolutions of a threaded shaft inserted into said central bore means.

16. An apparatus for fixing and non-rotatably clamping threaded shafts, comprising:
    a hollow tubular housing means having a central bore defining a central longitudinal axis;
    said hollow tubular housing means comprising an aperture means extending in a radial direction with regard to said central longitudinal axis and having a rectangular cross sectional shape;
    a clamping means adapted to be slidably received in said aperture means and having a front surface means provided with thread convolution means; and
    an operating means adapted to slidably move said clamping means received in said aperture means towards said central bore means and to lock a threaded shaft inserted into said bore means,
    wherein said hollow tubular housing means includes a sleeve means coaxially located with said central longitudinal axis at the end of said hollow tubular housing means, defining a bore segment of said central bore with a diameter adapted to receive said threaded shaft means to be fixed, whereby said aperture means is located in said sleeve means,
    wherein said operating means comprises an annular rotating collar means located around said sleeve means and having an inner circular surface with a radially, gradually enlarging recessed portion facing said clamping element, thereby adapted to move said clamping means towards said bore means upon rotation of said collar means.

17. Apparatus according to claim 1 in which said housing means is provided with a retaining ring means located below said rotating collar means.

18. An apparatus for fixing and clamping threaded shafts, comprising:
- a tubular housing having a central bore defining a central longitudinal axis, said tubular housing further having an aperture extending in a radial direction with regard to said central longitudinal axis;
- a clamp member slidably received in said aperture and having a front threaded surface portion; and
- an annular collar located around said tubular housing and configured to slidably move said clamp member within said aperture towards said central bore,
- wherein said actuator has an inner surface with a radially, gradually enlarging recessed portion facing said clamp member, and
- wherein rotation of said annular collar causes movement of said clamp member towards said central bore.

19. Apparatus according to claim 18 in which said aperture is configured to possess a conically narrowed portion at an end facing said central bore to form a stop.

20. Apparatus according to claim 18 in which an outer surface of said tubular housing has defined therein a reference surface portion.

* * * * *